US008464308B2

(12) United States Patent
LePrince et al.

(10) Patent No.: US 8,464,308 B2
(45) Date of Patent: Jun. 11, 2013

(54) METHOD FOR PROCESSING A CHANNEL REQUEST IN AN IPTV SYSTEM

(75) Inventors: Patrick LePrince, Chantepie (FR); Bernard Pichot, Boisgervilly (FR); Florent Fresnaye, Saint Aubin du Cormier (FR)

(73) Assignee: France Brevets, Paris (FR)

( * ) Notice: Subject to any disclaimer, the term of this patent is extended or adjusted under 35 U.S.C. 154(b) by 202 days.

(21) Appl. No.: 12/455,932

(22) Filed: Jun. 8, 2009

(65) Prior Publication Data

US 2010/0100913 A1   Apr. 22, 2010

(30) Foreign Application Priority Data

Jun. 9, 2008 (FR) .................................. 08 53804

(51) Int. Cl.
*H04N 7/173* (2011.01)
*H04N 21/438* (2006.01)
*H04N 21/643* (2006.01)
*H04N 21/61* (2006.01)

(52) U.S. Cl.
CPC ..... *H04N 21/4383* (2013.01); *H04N 21/64322* (2013.01); *H04N 21/6175* (2013.01)
USPC ............................ 725/131; 725/120; 725/109

(58) Field of Classification Search
None
See application file for complete search history.

(56) References Cited

U.S. PATENT DOCUMENTS

| 7,685,616 | B2 * | 3/2010 | Virdi et al. ...................... 725/38 |
| 2004/0194134 | A1 | 9/2004 | Gunatilake et al. |
| 2007/0107024 | A1 * | 5/2007 | Versteeg et al. ................. 725/95 |
| 2007/0107026 | A1 | 5/2007 | Sherer et al. |
| 2008/0244679 | A1 * | 10/2008 | Sukumar et al. ............. 725/121 |
| 2008/0288979 | A1 * | 11/2008 | Smoyer et al. .................. 725/39 |
| 2009/0031392 | A1 * | 1/2009 | VerSteeg et al. ............. 725/151 |
| 2010/0017463 | A1 * | 1/2010 | Horn et al. .................... 709/203 |

FOREIGN PATENT DOCUMENTS

| DE | 4304365 | 8/1994 |
| EP | 0821523 | 1/1998 |
| FR | 2784253 | 4/2000 |

OTHER PUBLICATIONS

Scott Shoaf et al. "IGMP Capabilities in Broadband Network Architectures" Internet Citation, Nov. 26, 2007 XP002459905 Nov. 26, 2007, *p. 5, *p. 8-11*, *p. 17*.
Search Report dated Oct. 10, 2008.

* cited by examiner

*Primary Examiner* — Chris Parry
(74) *Attorney, Agent, or Firm* — Myers Wolin, LLC

(57) ABSTRACT

A method for processing a channel change request in a television system operating according to the IP protocol. This method is implemented in a digital decoder of the subscriber and its purpose is to avoid overloading the access network in the case of burst zapping and avoid penalizing the reactivity time of the system in the case of simple zapping. In the case of reception of a burst of channel change requests separated by a time interval less than the duration of the predetermined timeout ($T_{tempo}$), the digital decoder transmits, to the access network of the system, two physical channel change requests, one for the first channel change request and the other for the last channel change request of the burst.

7 Claims, 3 Drawing Sheets

METHOD FOR PROCESSING A CHANNEL REQUEST IN AN IPTV SYSTEM

SCOPE OF THE INVENTION

The present invention relates to a method for processing a channel change request in a television system operating according to the IP protocol.

This application claims the benefit, under 35 U.S.C. §119 of EP Patent Application 0853804, filed Jun. 9, 2008.

TECHNOLOGICAL BACKGROUND

In television systems operating according to IP (Internet Protocol) protocol, the video streams are generally transmitted to subscribers via a broadband connection. More specifically, a transmission signal is transmitted to digital decoders (Set Top Box) of subscribers via an access network and DSL (Digital Subscriber Line) modems. This transmission signal is decoded then converted into standard television signals by the digital decoder of the subscriber.

To change channel, the subscriber presses the programme keys P+ or P− of the digital decoder remote control. The P+ key enables incrementing the channel number currently being viewed and the P− key enables decrementing it. In response to a channel change request, the digital decoder transmits to the access network a physical channel change request via its DSL modem. Typically this request is carried out using the IGMP (Internet Group Management Protocol) protocol. In this case, the physical channel change request is a subscription request. The digital decoder then sends as a subscription parameter the IP address of the channel that it wants to receive.

Figure 1:
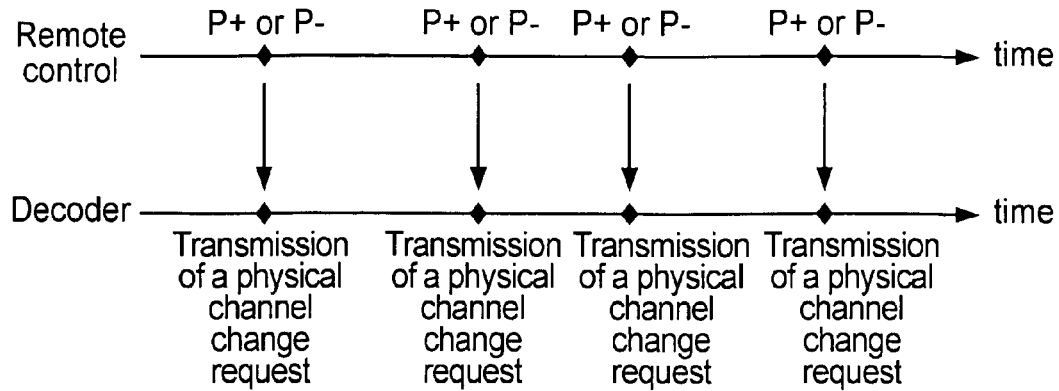

FIG. 1 shows a timing diagram showing the transmission of physical channel change requests by the decoder following a plurality of channel change requests from the subscriber via his remote control according to a standard process of the prior art. When the subscriber presses the P+ or P− key of his remote control, the decoder immediately transmits a physical channel change request to the access network. If the subscriber presses n times successively on the keys P+ or P− of his remote control in a very short time interval to rapidly attain a given channel, n physical channel change requests are transmitted to the access network although only the last of them would suffice as it contains the IP address of the last requested channel. This massive transmission of physical channel change requests creates a useless overloading, even saturation, of the access network.

Figure 2:
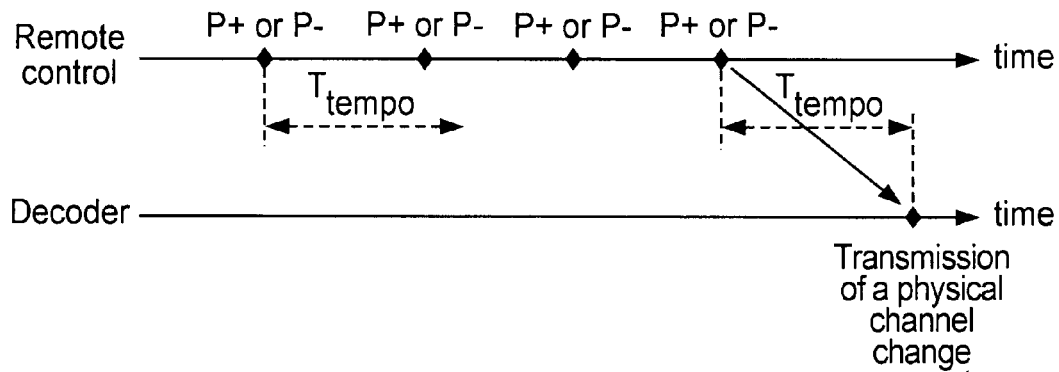
Figure 3:
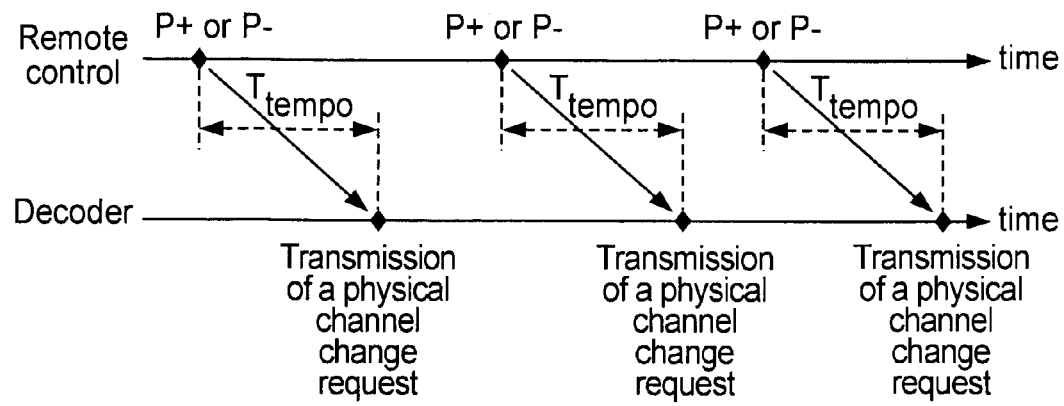

To avoid this overloading of the access network, it is known in the art to not transmit all the physical channel change requests. This operating mode is shown in FIGS. 2 and 3 and is classically known as virtual zapping. When the digital decoder receives a channel change request (pressure on the P+ or P− key of the remote control), it triggers a timeout for a duration $T_{tempo}$. If no new channel change request is received during this timeout, a physical channel change request corresponding to this channel change request is transmitted at the end of this timeout. Inversely, if a new channel change request is received during this timeout, the timeout is reset and the process previously described is recommenced.

FIG. 2 shows a case where several channel change requests are received by the digital decoder during a reduced time period, the time interval between each channel change request being less than the period $T_{tempo}$ of the timeout. This is then referred to as burst zapping or as a channel change request burst. In the example shown in this figure, the digital decoder receives 4 channel change requests corresponding to four successive and grouped presses on the P+ or P− key of the remote control. In this example, a channel change request is received during the timeout of the first three channel change requests. No physical channel change request is therefore transmitted for these first three channel change requests. Information relating to these channel change requests is however displayed upon their reception on the television screen connected to the digital decoder to inform the subscriber that his requests were indeed received by the decoder. Finally, concerning the fourth channel change request, no other channel change request being received during its timeout period, a physical channel change request corresponding to this channel change request is therefore transmitted to the access network at the end of the timeout period.

FIG. 3 shows a case where several channel change requests are received by the digital decoder over a longer time period, the time interval between each channel change request being greater than $T_{tempo}$. This case corresponds to a slow zapping situation in which the subscriber carries out successively several simple zappings. In this situation, the subscriber does not want to go directly to a given channel but wants to view each of the channels corresponding to a press of the P+/P− key. In the case shown in FIG. 3, the digital decoder receives three channel change requests separated from each other by a time interval greater than $T_{tempo}$. No channel change request being received during the timeout period of the 3 channel change requests, a physical channel change request corresponding to each of these channel change requests is transmitted at the end of the timeout period that follows the reception of the channel change request.

The operating mode described with respect to FIGS. 2 and 3 enables the transmission of a large number of physical channel change requests to the access network to be avoided and thus avoids an overloading or saturation of this latter. However, the physical channel change requests are transmitted to the access network with a delay equal to the duration of the timeout ($T_{tempo}$). The result is that, in the case of a simple zapping, the system loses in reactivity as the subscriber must wait, in addition to the processing time of a request by the network, the time $T_{tempo}$ before obtaining the channel change on his television. Moreover, this runs counter to the improvement in the service quality required by the operators.

SUMMARY OF THE INVENTION

The present invention enables all or some of the previously cited problems to be overcome.

For this purpose, the present invention proposes a method for processing a channel change request in a television system on IP comprising a digital decoder connected to a television and an access network, remarkable in that, in response to said channel change request, the digital decoder carries out the following steps:

a) transmits to the access network a physical channel change request corresponding to the channel change request, and triggers a timeout period of $T_{tempo}$, b) if a new channel change request is received by the digital decoder during said timeout period, it triggers a new timeout period of $T_{tempo}$, and c) transmits to the access network a physical channel change request corresponding to the channel change request as soon as the new timeout period has ended or, if a new channel change request is received by the digital decoder during the new timeout period, it restarts at step b).

Hence in the case of burst zapping, a physical channel change request is transmitted only for the first and last channel change requests of the burst. The physical channel change request corresponding to the first channel change request is transmitted upon reception of the first channel change request by the decoder and the physical channel change request corresponding to the channel change request is transmitted upon the expiration of the timeout period of the last channel change request. In the case of simple zapping, the physical channel change request is transmitted immediately after the reception of the channel change request.

Hence the present invention enables both to avoid overloading the access network in the case of burst zapping and to not penalise the system reactivity time in cases of simple zapping.

According to a preferred embodiment, the decoder also transmits, during step a), a control message to display on the television information relating to the channel requested to inform the subscriber that his channel change request was indeed received by the decoder.

Likewise, according to another preferred embodiment, the decoder also transmits, during step b), a control message to display on the television information relating to the channel newly requested.

The invention also relates to a digital decoder for a television system on IP, said digital decoder is connected to a television and an access network and comprises the means to process channel change requests able to implement the aforementioned method.

DETAILED DESCRIPTION OF THE FIGURES

Figure 4:
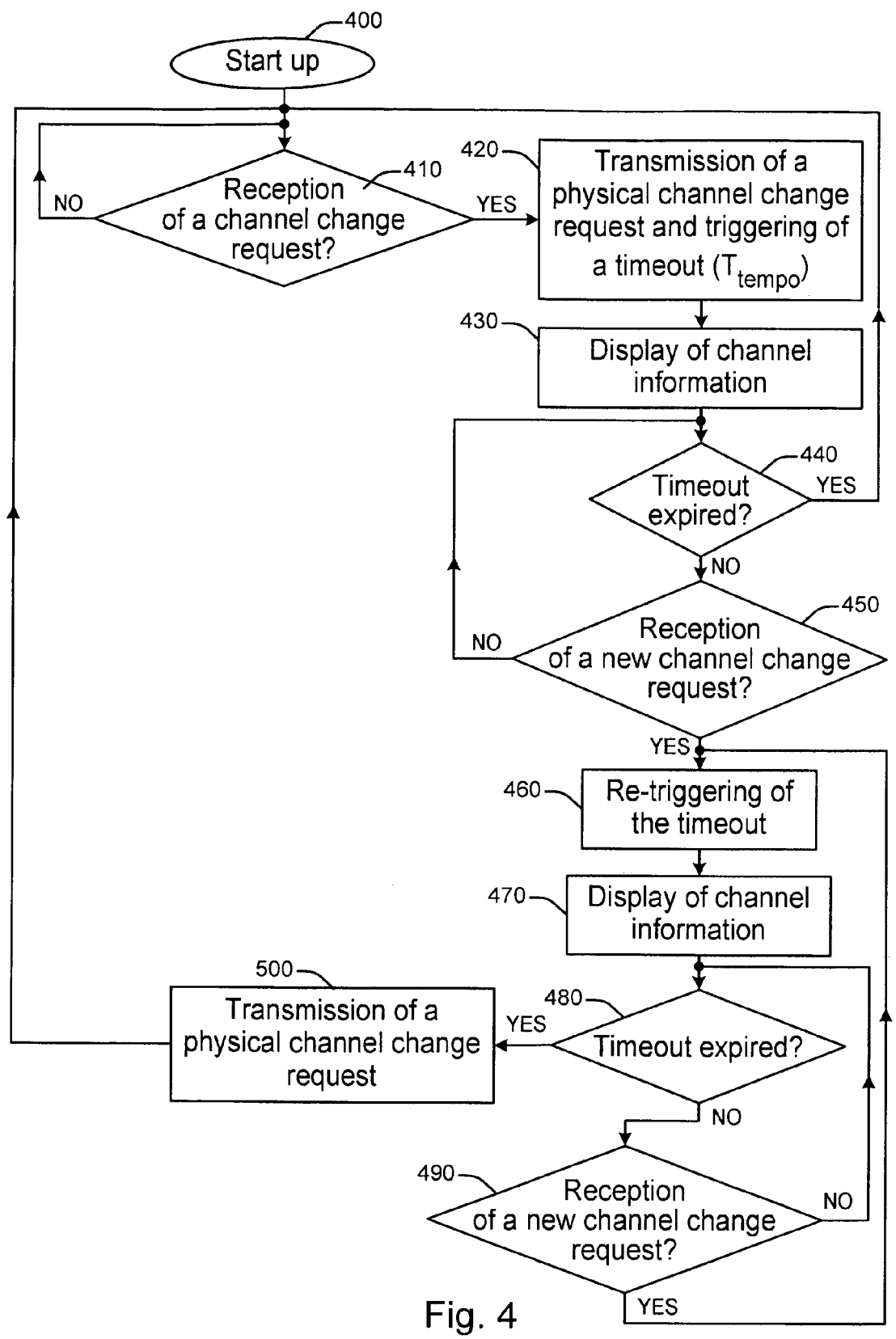
Figure 5:
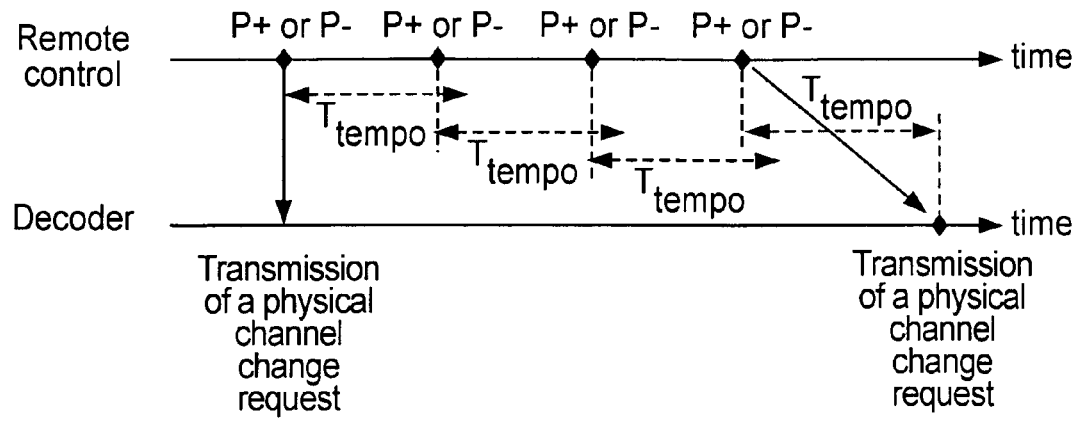
Figure 6:
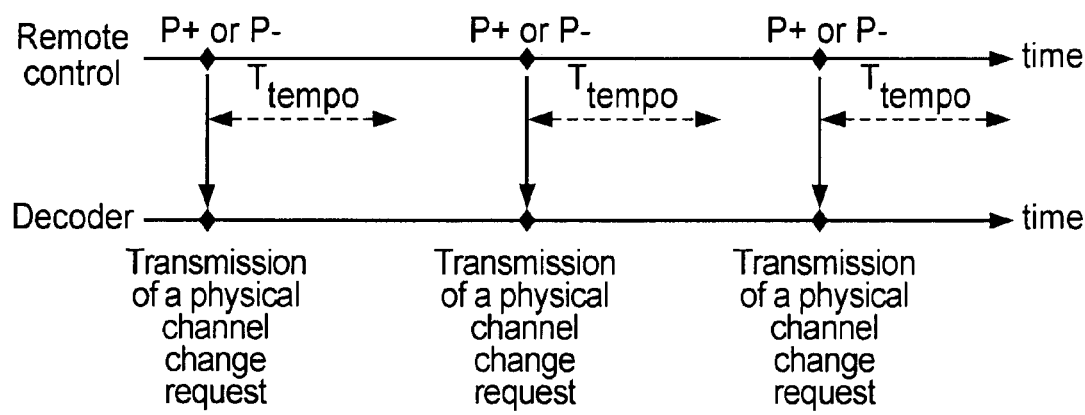

The invention will be better understood, and other purposes, details, characteristics and advantages will appear more clearly over the following detailed explanatory description of a preferred embodiment of the invention, with reference to annexed diagrammatical drawings among which:

FIG. 1, already described, is a timing diagram showing the processing of a plurality of channel change requests according to a first method known in the prior art, FIG. 2, already described, is a timing diagram showing the processing of a burst of channel change requests when this burst is processed by a second method known in the prior art, FIG. 3, already described, is a timing diagram showing the processing of a plurality of simple channel change requests when this plurality is processed by the second method known in the prior art, FIG. 4 shows a flowchart of the steps of the method of the invention, FIG. 5, to be compared with FIG. 2, is a timing diagram showing the processing of a burst of channel change requests when this burst is processed by the method of FIG. 4, and FIG. 6, to be compared with FIG. 3, is a timing diagram showing the processing of a plurality of simple channel change requests when this plurality is processed by the method of FIG. 4.

DETAILED DESCRIPTION OF THE INVENTION

FIG. 4 shows the processing of channel change requests according to the invention. This processing is implemented in the digital decoder. Hereafter in the description, the digital decoder is considered to be connected in one part to the access network, for example via a DSL modem, and in another part to a display device such as a telephone.

The method shown in FIG. 4 comprises firstly a step 400 of start-up to initialise the process.

The decoder then tests, during a step referenced as 410, if it has received a channel change request from the remote control of the decoder. In the negative, it waits for a channel change request. In the affirmative, the decoder implements step 420. In this step, the decoder immediately transmits a physical channel change request, for example in the form of a subscription request in the case of IGMP protocol, to the access network and triggers a timeout period with a duration of $T_{tempo}$. Preferably, the decoder also commands, through the transmission of a control message, the display of information relating to the channel change request on the screen of the television connected to the decoder to inform the subscriber that his channel change request has indeed been received by the decoder. This transmission shown by step 430 in FIG. 4 can be carried out at the same time as step 420.

The following steps, 440 and 450, are test steps to determine if the decoder has received a new channel change request during the timeout period. If the timeout period expires without a new change request being received, there is a return to step 410. However, if a new channel change request is received before the end of the timeout period, there is a passage to step 460.

At step 460, the decoder triggers a new timeout period. Preferably, the decoder also commands, through the transmission of a control message, the display of information relating to the new channel change request on the screen of the television connected to the decoder in a step 470. This step can be carried out at the same time as step 460.

The following steps, 480 and 490, are test steps to determine if the decoder has received a new channel change request during this new timeout period. If this new timeout period expires, without a new change request being received, a physical channel change request is transmitted to the access network in step 500 and if not it is restarted at step 460.

Finally, after step 500, it is restarted at step 410.

The results of this method are shown in FIGS. 5 and 6. FIG. 5 shows more specifically the results of the method of the invention in the case of burst zapping and FIG. 6 shows the results of the method of the invention in the case of simple zapping. These results are to be compared with those of FIGS. 2 and 3.

In response to a burst of channel change requests (case where the time interval between two consecutive requests is less than $T_{tempo}$), the decoder transmits a physical channel change request for the first and last channel change requests of the burst. The physical channel change request corresponding to the first channel change request is transmitted immediately after the reception of the first channel change request. The physical channel change request corresponding to the last channel change request is transmitted at the end of a timeout period of the last channel change request. Hence, if these results are compared to those of FIG. 2, the decoder only transmits two physical channel change requests instead of n requests (in the case of a burst comprising n channel change requests). The access network is therefore not saturated with requests.

In response to a plurality of simple channel change requests (case where the time interval between two consecutive requests is greater than $T_{tempo}$), the decoder transmits a physical channel change request for each of the channel change requests and this physical channel change request is transmitted immediately after reception of the channel change request. Hence, if these results are compared with those of FIG. 3, the decoder gains in reactivity as it transmits the physical channel change request as soon as the channel change request is received.

The duration of the timeout period employed in this method is comprised between 300 ms and 700 ms. It is preferably in the order of 500 ms.

Though the invention has been described in relation to a specific embodiment, it is evident that this is in no way restricted and that it comprises all technical equivalents of the steps described as well as their combinations if these enter into the scope of the invention.

The invention claimed is:

1. A method for processing a channel change request in a television system on IP comprising a digital decoder connected to a television and an access network, wherein, to optimize bandwidth allocation of channel change requests transmitted in simple zapping mode and in burst zapping mode, and in response to said channel change request, the digital decoder carries out the following:
   a) in both the simple zapping mode and the burst zapping mode, at substantially the same time, transmitting to the access network a first physical channel change request corresponding to the channel change request, and triggering a timeout period of $T_{tempo}$;
   b) if a new channel change request is received by the digital decoder during said timeout period, triggering a new timeout period of $T_{tempo}$, and
   c) transmitting to the access network a second physical channel change request corresponding to the new channel change request as soon as the new timeout period has ended or, if a new channel change request is received by the digital decoder during the new timeout period, restarting at b).

2. The method according to claim 1, wherein, during a) the decoder transmits a control message to display on the television information relating to the requested channel.

3. The method according to claim 1, wherein, during b) the decoder transmits a control message to display on the television information relating to the newly requested channel.

4. The method according to claim 1, wherein the duration of $T_{tempo}$ is comprised between 300 ms and 700 ms.

5. The method according to claim 4, wherein the duration of $T_{tempo}$ is equal to 500 ms.

6. The method according to claim 1, wherein the physical channel change request is a subscription request in compliance with the IGMP protocol.

7. A digital decoder for a television system on IP, said digital decoder is connected to a television and an access network, said digital decoder being configured to process channel change requests in order to optimize bandwidth allocation of channel change requests transmitted in simple zapping mode and in burst zapping mode, wherein said configuration allows for channel change requests to be effected by carrying out the following:
   a) in both the simple zapping mode and the burst zapping mode, at substantially the same time, transmitting to the access network a first physical channel change request corresponding to the channel change request, and triggering a timeout period of $T_{tempo}$;
   b) if a new channel change request is received by the digital decoder during said timeout period, triggering a new timeout period of $T_{tempo}$, and
   c) transmitting to the access network a second physical channel change request corresponding to the new channel change request as soon as the new timeout period has ended or, if a new channel change request is received by the digital decoder during the new timeout period, restarting at b).

* * * * *